United States Patent

[11] 3,614,234

| [72] | Inventor | Lee O. Heflinger<br>Torrance, Calif. |
| --- | --- | --- |
| [21] | Appl. No. | 840,908 |
| [22] | Filed | July 11, 1969 |
| [45] | Patented | Oct. 19, 1971 |
| [73] | Assignee | TRW Inc.<br>Redondo Beach, Calif. |

[54] FRINGE-GENERATING HOLOGRAPHIC SYSTEM
8 Claims, 4 Drawing Figs.

[52] U.S. Cl. .................................................. 356/106, 350/3.5
[51] Int. Cl. ................................................ G01b 9/02, G02b
[50] Field of Search ........................................ 356/106; 350/3.5

[56] References Cited
OTHER REFERENCES

"Holographic Reconstruction Without Granulation"; pg. 126- 128 Martienisen et al.; Physics Letters; Vol. 24A 02 1967

"Holography and its Applications," A. E. Ennos; Contemp. Physics; 1967 Vol. 8 02 153- 170

*Primary Examiner*—Ronald L. Wibert
*Assistant Examiner*—Conrad Clark
*Attorneys*—Daniel T. Anderson, Edwin A. Oser and Jerry A. Dinardo ABSTRACT: A double-exposure holographic system having means for producing finite fringes at the plane of an object. To this end a first hologram is made without the object and by passing the scene beam through a light diffuser. For the second exposure the object is inserted into the path of the scene beam. Alternatively the two exposures are taken with an object and then with the displaced or perturbed object. Also the light diffuser is rotated in such a manner that finite fringes appear at the plane of the object. The spacing between adjacent fringes may be controlled by the angle through which the diffuser is rotated.

Lee O. Heflinger
INVENTOR.

PATENTED OCT 19 1971 3,614,234

Lee O. Heflinger
INVENTOR.

BY Edwin A. Oser

ATTORNEY

Lee O. Heflinger
INVENTOR.

FRINGE-GENERATING HOLOGRAPHIC SYSTEM

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates generally to holographic systems and particularly relates to double-exposure holograms of objects in transmission.

Much of the aerodynamic work in the past has been done by conventional optical interferometric methods. In that case it is conventional practice to produce finite interference fringes generally in the plane of an object. This may, for example, be done by providing two virtual adjacent light sources which then generate light fringes by the interference of two light beams from the two virtual light sources. One advantage of these fringes is that they permit to measure with precision distances between portions of the object. It is also feasible to measure variations of the denisty of the gas involved. This occurs, for example, when pictures of shock waves generated in a gas are taken. The fringes also facilitate the determination of the sense of variations, such as those of the index of refraction of an object.

Recently aerodynamic research has been carreid out by means of holography. For example, wind tunnel measurements of aerodynamic flow may be carried out for wake and shock analysis. The application of holography to these and related subjects has great advantages. As is well known, holograms have three-dimensional aspects and therefore, one hologram gives much more information than a conventional photograph. In addition, it is possible to take holograms of high-speed phenomena and study the hologram later at leisure.

As a result, it has not been possible heretofore to prepare a hologram with finite fringes disposed in a desired plane. In the past where fringes did appear in a hologram they were located at random and often at infinity, and therefore could not be used for measuring distances or variations in the density of a gas.

It is accordingly an object of the present invention to provide a double-exposure holographic system including means for providing finite fringes in the hologram at a predetermined plane.

Another object of the present invention is to provide a double exposure holographic system where fringes are generated having a predetermined spacing and disposed substantially in the plane of an object to measure gas density variation.

A further object of the present invention is to provide a holographic system of the type referred to which permits to measure the density of gases without requiring expensive additional equipment.

SUMMARY OF THE INVENTION

In accordance with the present invention there is provided a holographic system. The system serves the purpose of producing finite fringes substantially at the plane of an object. These fringes are seen when the hologram of the object and the fringes is viewed. To this end there is provided a light source such as a laser for generating a substantially monochromatic light beam. The light is split by a beam splitter into a scene beam and a reference beam. A photosensitive recording material such as a photographic film or plate or a photochromic material is diposed in a predetermined plane. Optical means are provided for projecting the reference beam onto the recording material as well as the scene beam. A light diffuser is interposed into the path of the scene beam and ahead of the object ot be recorded. This light diffuser is capable of being rotated about a predetermined point outside the plane of the light diffuser. This will generate finite fringes on the hologram when a double-exposure is made with the light diffuserin two separate positions.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
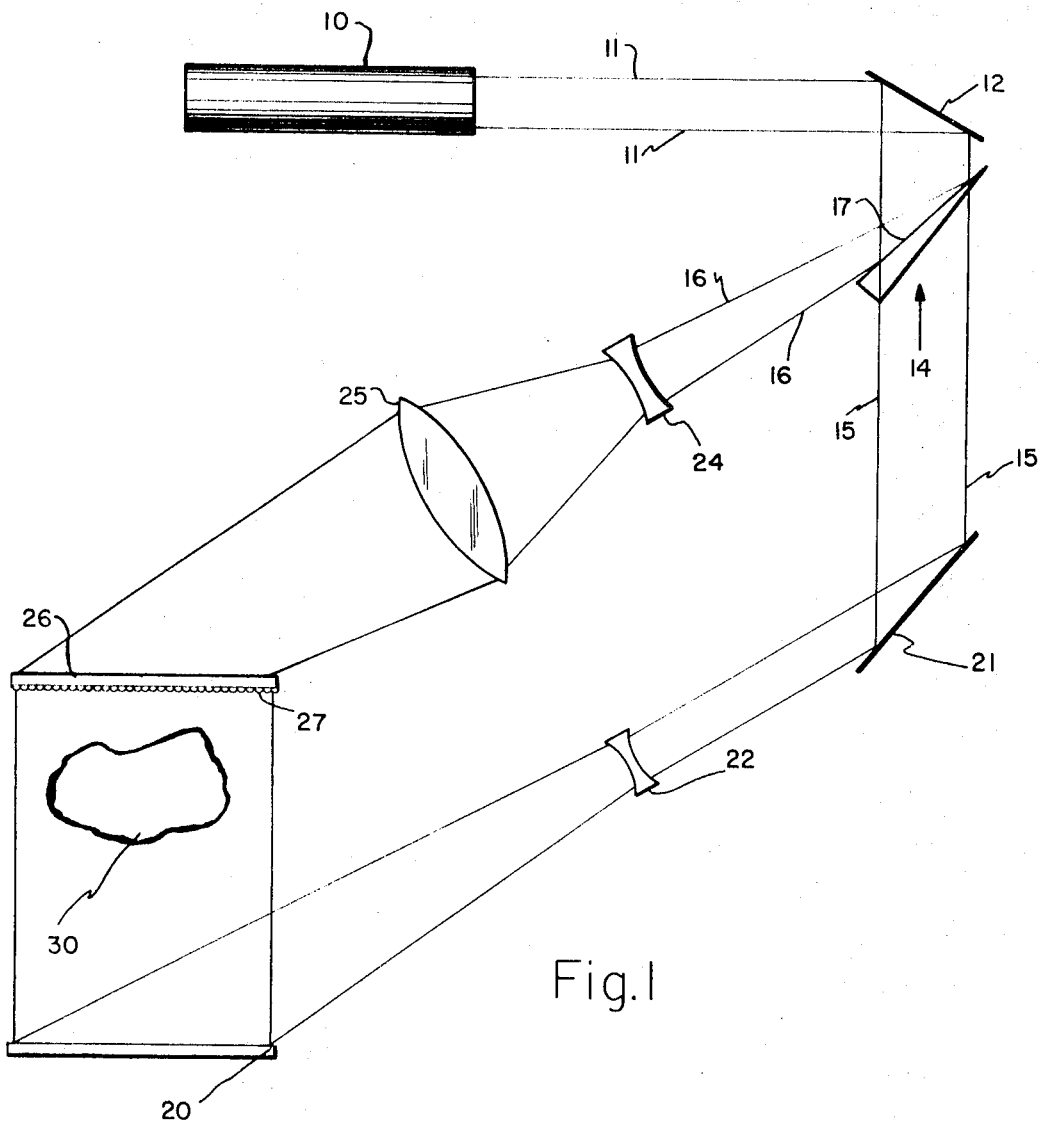
FIG. 1 is a schematic representation of a holographic system embodying the present invention and including a light diffuser.

Referring now to the drawings, wherein like elements are designated by the same reference characters, and particularly to FIG. 1, there is illustrated a generally conventional holographic system for producing fringes in accordance with the present invention. The system of FIG. 1 includes a monochromatic light source, such for example, as a laser 10. The laser 10 accordingly generates a monochromatic light beam 11 which is reflected by a suitable reflector 12, such for example, as a front surface mirror. The resulting beam is now split by a beam splitter 14 into a reference beam 15 and a scene beam 16. The beam splitter 14 may consist as shown of a wedge of glass having its front surface 17 made partially reflecting so as to reflect the bulk of the light intensity of the laser beam into the scene beam 16. A relatively small portion of the light intensity is transmitted through the beam splitter or wedge 14 to form the reference beam 15.

The rerefence beam is now projected onto a photosensitive recording material 20. This may consist, for example, of a photographic plate or film or of a photochromic material or any other material capable of recording light. The reference beam may be deflected again by a reflector 21, which may be identical with the reflector 12.

The reference beam is then preferably diverged by a diverging lens 22 so that the entire surface of the recording material 20 is covered by the reference beam. The diverging lens 22 may be a negative lens as shown.

The scene beam 16 is also diverged by a diverging lens 24. This may again be a negative lens as shown. Subsequently the scene beam is collimated by a collimating lens 25. Accordingly, a parallel beam of light impinges on a light diffuser 26 having a diffusing surface 27. Such a light diffuser may consist of glass plate which is made diffusing by roughening its surface or frosting it. Alternatively a suitable plastic material may be used having a light diffusing surface. Accordingly the light is scattered by the diffusing surface 27 and passes through an object 30 to be recorded before impinging on the recording material 20.

The holographic system described is substantially conventional except for the provision of the light diffuser 26 and its function. In accrodance with the present invention a hologram is made by the double-exposure technique. Thus a hologram is first taken in the absence of the object 30. Then a second hologram is made with the object 30 in place. Alternatively the first hologram may be taken with an object and the second hologram with the same object, which is now displaced or perturbed. Between the two exposures the light diffuser 26 is rotated through a selected point outside of the plane of the diffuser. Due to the differences in the paths of the light rays passing through the diffuser 26 in two different positions, a system of fringes is developed. These fringes are due to the interference of two light beams having different paths. Accordingly these light beams may either reinforce or cancel to generate light and dark fringes. The distance between adjacent light fringes is determined among others by the wavelength of the light and the angle of rotation of the light diffuser 26.

A double exposure holographic system as described has the usual advantages. Thus since two exposures are made, one with and one without the object, or one with an unperturbed and one with a perturbed object, all optical irregularities are eliminated and only those introduced by the object show on the hologram. This, of course, means that it is possible to utilize relatively inexpensive optical componnets such as reflectors and lenses. These components do not have to be optically perfect because any imperfections are compensated for by the double exposure.

The manner in which the light diffuser 26 may be rotated through a point outside of the plane of the light diffuser will now be explained in connection with FIG. 2., to which reference is made. Here the light diffuser 26 is mounted on a tiltable adjustment bar 32. A mounting block may be connected to the bar 32, for example, by soldering or welding, from which extends a rod 34 and which carries an adjustable block 35 to which the diffuser 26 is secured, for example, by a suitable cement. The light diffuser 26 may be raised or lowered with respect to the rod 34 and may be held in any desired adjustment by the set screw 36 extending through the block 35.

The adjustment bar 32 may be mounted on a rigid support plate 37 having two pins 38 extending through the support plate 37 to provide a two point support. A relatively rigid plate 40 is rigidly secured to the support 37 and is provided with another pin 41 to provide the third point support of the mechanism.

The adjustment palte 32 may be attached to the support 37 by a relatively thin and flexible metallic sheet 42. This sheet 42 is clamped between a pair of supporting blocks 43 and 44 by means of a pair of screws 45. The blocks 43, 44 are fixed to the plate 40. The metal sheet 42 may be secured to the adjustment plate 32 by another pair of screws 46.

The axis of rotation of the adjustment plate 32 is provided by a pair of set screws 48 extending through the rigid plate 40 and providing a bearing for the adjustment plate 32. Another adjustment screw 50 extends through the rigid plate 40 and bears against the adjustment palte 32 with its rounded end portion 51. A spring 52 may be mounted between the support plate 40 and the adjustment plate 32 for urging them toward each other.

Accordingly by rotating the adjustment screw 50, the distance between the adjustment plate 32 and its support 40 may be increased or decreased. The spring 52 serves the purpose to keep the adjustment plate 32 in contact with the adjustment screw 50. Accordingly the adjustment plate 32 rotates about an axis 54 passing through the points of the set screws 48 and having a distance $R_3$ from the diffuser 26 as indicated by the arrow. It will therefore be seen that rotation of the screw 50 will rotate the entire light diffuser 26 about the aixs 54 through any desired angle which may be made very small.

Figures 2, 3:
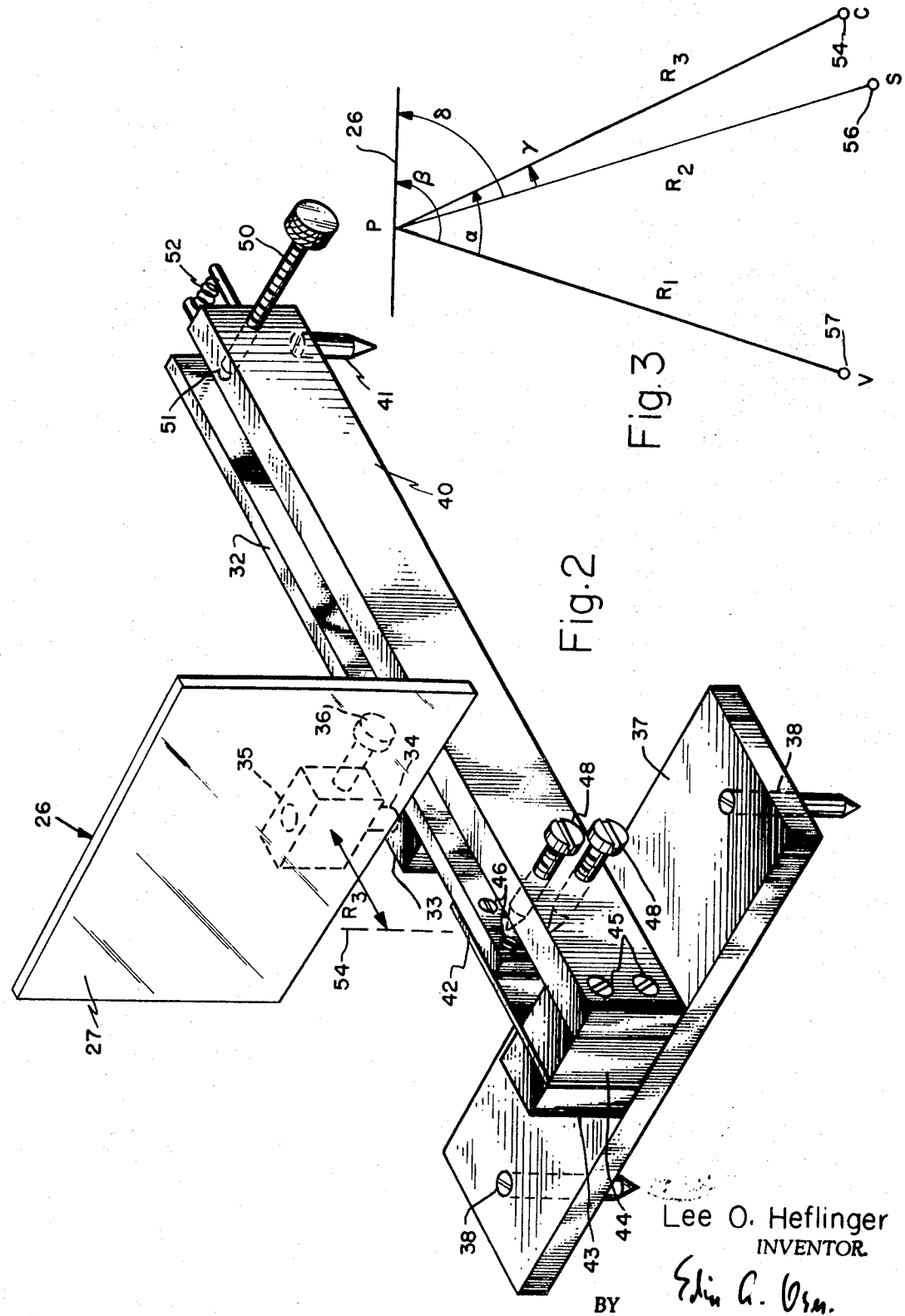
FIG. 2 is a perspective view of a mechanism which may be used in accordance with the present invention for rotating the light diffuser of the system of FIG. 1.
FIG. 3 is a diagram of the geometric relationship of the light source, the point or rotation, the viewing point and the light diffuser.

It will be understood that the adjustment device of FIG. 2 may form part of the holographic system of FIG. 1. This, of course, permits to rotate the diffuser 26 through any desired angle. It will also be understood that other means for rotating the diffuser 26 about a given axis and through any desired angle may readily be devised.

The diagram of FIG. 3 will be helpful in understanding the geometric relationships involved. Thus the line 26 indicates the plane of the light diffuser which is rotated about point C, corresponding to the axis 54 in FIG. 2. Accordingly $R_3$ represents the distance between the axis of rotation 54 and an arbitrary point P on the light diffuser 26. The point 56 also indicated by S is the apparent origin of the scene beam. Thus in the holographic system of FIG. 1 where the scene beam is parallel, the point S is located at infinity. In any case the distance between the point 56 and point P on the light diffuser 26 is indicated by $R_2$. $R_1$ indicates the distance between a point V or 57, which is the viewing point of the hologram and the point P. Various angles $\alpha$, $\beta$, $\gamma$, $\delta$, are also shown on the diagram of FIG. 3. Thus the angle $\alpha$ is the angle between is the angle between $R_1$ and $R_3$. The angle $\beta$ is the angle between $R_1$ and the light diffuser 26. The angle $\gamma$ is the angle between $R_2$ and $R_3$, while the angle $\delta$ is the angle between $R_2$ and the light diffuser 26.

A mathematical analysis of this diagram shows that the distance $f$ from the point P to the focus of the intereference fringes is given by the following equation:

$$f = R_3 \cos \alpha \frac{1}{1 + \frac{\sin \delta}{\sin \beta}\left[1 - \frac{R_3 \cos \gamma}{R_2}\right]} \quad (1)$$

This formula may be used to select the location of the point C so that the focal plane of the fringes will lie in the plane of the object as desired.

From this equation it will be seen that if $R_2$, that is, the distance between the apparent origin of the light source and the light diffuser is infinity, the expression in the bracket of equation (1) becomes unity. It should also be noted that any combination of translation and rotation of the glass diffuser 26 can be described mathematically simply as a rotation about an appropriately chosen point C of FIG. 3.

Figure 4:
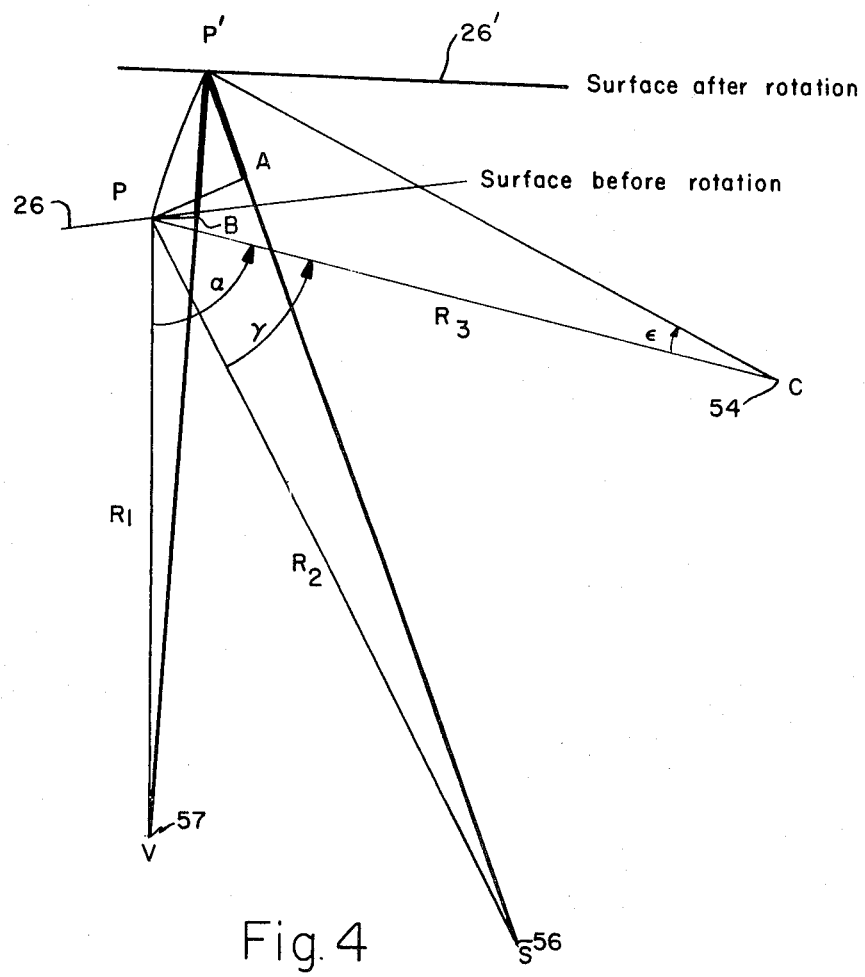
FIG. 4 is a diagram of a geometric relationship similar to that of FIG. 3, but illustrating the light diffuser in two different positions.

Reference is now made to the diagram of FIG. 4 which shows the geometry of the arrangement before and after rotation of the light diffuser 26. Thus 26 indicates the surface of the light diffuser before rotation and line 26' indicates the surface after rotation. The point P is again any point on the surface of the light diffuser, while P' is the same point after rotation of the diffuser. The rotation takes place again about the point C or 54 and the angle of rotation is shown by $\epsilon$. The distances $R_1$, $R_2$ and $R_3$ have the same meaning as previously explained. So do the angles $\alpha$ and $\gamma$.

The effect of the rotation of the light diffuser from position 26 to position 26' causes a differnece in the light paths. This extra optical path length for the rays from the scattering point P is shown by the line segments AP' and BP'. From this geometric relationship it is now possible to calculate the distance S between two adjacent light fringes. These light fringes are in the focal plane determined previously by $f$. The equation for S is as follows:

$$S = \frac{\lambda}{\epsilon}\left(1 - \frac{f}{R_1}\right) \frac{1}{1 + \frac{\sin \delta}{\sin \beta}\left[1 - \frac{R_3 \cos \gamma}{R_2}\right] - \frac{R_3 \cos \alpha}{R_1}} \quad (2)$$

It will again be noted that if the scene beam is collimated, $R_2$ becomes infinity and the expression in brackets becomes 1.

In the above formula (2) $\lambda$ is, of course, the wavelength of the light.

It will now be seen that by using formula (1) the distance $f$ of the fringes from the light diffuser 26 may be determined. Further by means of formula (2) the spacing of the fringes may also be determined. It will be noted that given the other quantities, this depends primarily on the angle $\epsilon$.

Experiments have shown that the agreement between formula (1) an experimentally obtained fringes is satisfactory in view of an uncertainty in determining the effective location of the glass diffuser. In general the distance $R_3$ may be chosen infinity, that is, parallel light may be used for illuminating the diffuser 26. However, it will be understood that the lens 25 may be omitted, in which case $R_3$ has a definite value. Also the angle $\alpha$ may be chosen as 90° for the center of the diffuser 26. This minimizes sensitivity to changes of the angle $\beta$.

The finite fringe holographic interferogram of the invention may find application in many different fields. For example, this amy be used for measuring the shock waves created by a flying bullet. In general, it may be used for aerodynamics or else as a space coordinate or contour map. Specifically the firnges permit the determination of the sense of an increase or decrease of the index of refraction of the object. It may further be used for investigating chemical phenomena such as diffusion of liquids and the like. It will also be evident that the finite fringes obtained in accordance with the present ivnention may be utilized for measuring the gas density from the distance between an undisturbed and a disturbed fringe. In general, since the distance between fringes can be determined by formula (2) the fringes may be used as a scale for determining actual distances in the hologram.

There has thus been disclosed a double-exposure holographic system which makes it possible to record not only the hologram of an object, but a set of interference fringes appearing in a predetermined plane. This may be effected by rotating a glass diffuser in the path of the scene beam between the two exposures. The geometry of the arrangement determines the location of the plane of the fringes. The amount of rotation, among others, determines the distance between two adjacent fringes. This holographic system and method are particularly useful for holograms of objects obtained in transmission. It may be used in aerodynamics, chemistry, or for the investigation of shock waves, such as caused by flying bullets, rocket exhausts and the like.

What is claimed is:

1. A holographic system for producing finite fringes substantially at the plane of an object when viewing a hologram of the object and the fringes, said system comprising;
    a. a light source for generating a substantially monochromatic beam of light;
    b. a beam splitter for splitting said beam of light into a scene beam anda reference beam;
    c. a photosensitive recording material disposed in a predetermined plane;
    d. first optical measn for projecting said reference beam onto said recording material;
    e. second optical means for projecting said scene beam onto said recording material;
    f. a light diffuser interposed into the path of said scene beam ahead of an object to be recorded; and
    g. means for rotating said light diffuser about a predetermined point outside of the plane of said light diffuser for generating finite fringes on the hologram produced on said recording material when a double exposure is made with said light diffuser in two separate positions.

2. A holapgric system as defined in claim 1 wherein said second optical means includes lens means for projecting collimated scene beam on said light diffuser.

3. A holographic system as defined in claim 1 wherein the distance between said point of rotation and said light diffuser, the distance between the apparent source of said scene beam and said light diffuser, the angle between the viewing point and the point of rotation of said diffuser, the angle between said viewing point an the plane of said diffuser, the angle between said apparent source of said scene beam and said point of rotation and the angle between said apparent scene beam source and the plane of said diffuser are so selected that the plane of said fringes is located at a predetermined distance from said light diffuser.

4. A holographic system as defined in claim 1 wherein said light diffuser is rotated through a predetermined angle between a first and a second exposure of the hologram, whereby the distance between adjacent fringes is determined.

5. A method of recording a hologram of an object in such a manner tha finite fringes appear substantially in the plane of an object, said method comprising the steps of:
    a. generating a substantially monochromatic light beam;
    b. splitting the light beam into a reference beam and a scene beam;
    c. directing the reference beam onto a recording material for recording a hologram;
    d. directing the scene beam onto the recording material;
    e. passing the light of the scene beam through a light diffuser disposed ahead of an object to be recorded; and
    f. recording the monochromatic reference and scene beams with an unperturbed object on the recording material and thereafter recording again the monochromatic beams through a perturbed object to be recorded with the light diffuser in a position obtaned by rotating the light diffuser through a point outside of the plane thereof and in such a manner that finite fringes apepar substantially in the plane of the object being recorded.

6. A method as defined in claim 5 wherein the scene beam is collimated before it is passed thorugh the light diffuser.

7. A method as defined in claim 5 wherein the distance between the point or rotation and the light diffuser, the distance between the apparent origin of the scene beam and the diffuser, the angle from the viewing point to the point of rotation, the angle from the viewing point to the plane of the diffuser, the angle from the apparent source of the scene beam to the rotation point and the angle from the apparent source of the scene beam to the plane of the diffuser, are so selected that the fringes are located in a predetermined plane spaced from the light diffuser.

8. A method as defined in claim 5 wherein the light diffuser is rotated between two successive recordings through a predetermined angle, thereby to determine the distance between adjacent fringes.